No. 750,752. PATENTED JAN. 26, 1904.
E. S. COLE.
MEANS FOR CONTROLLING FLOWING STREAMS.
APPLICATION FILED JULY 25, 1902.
NO MODEL.
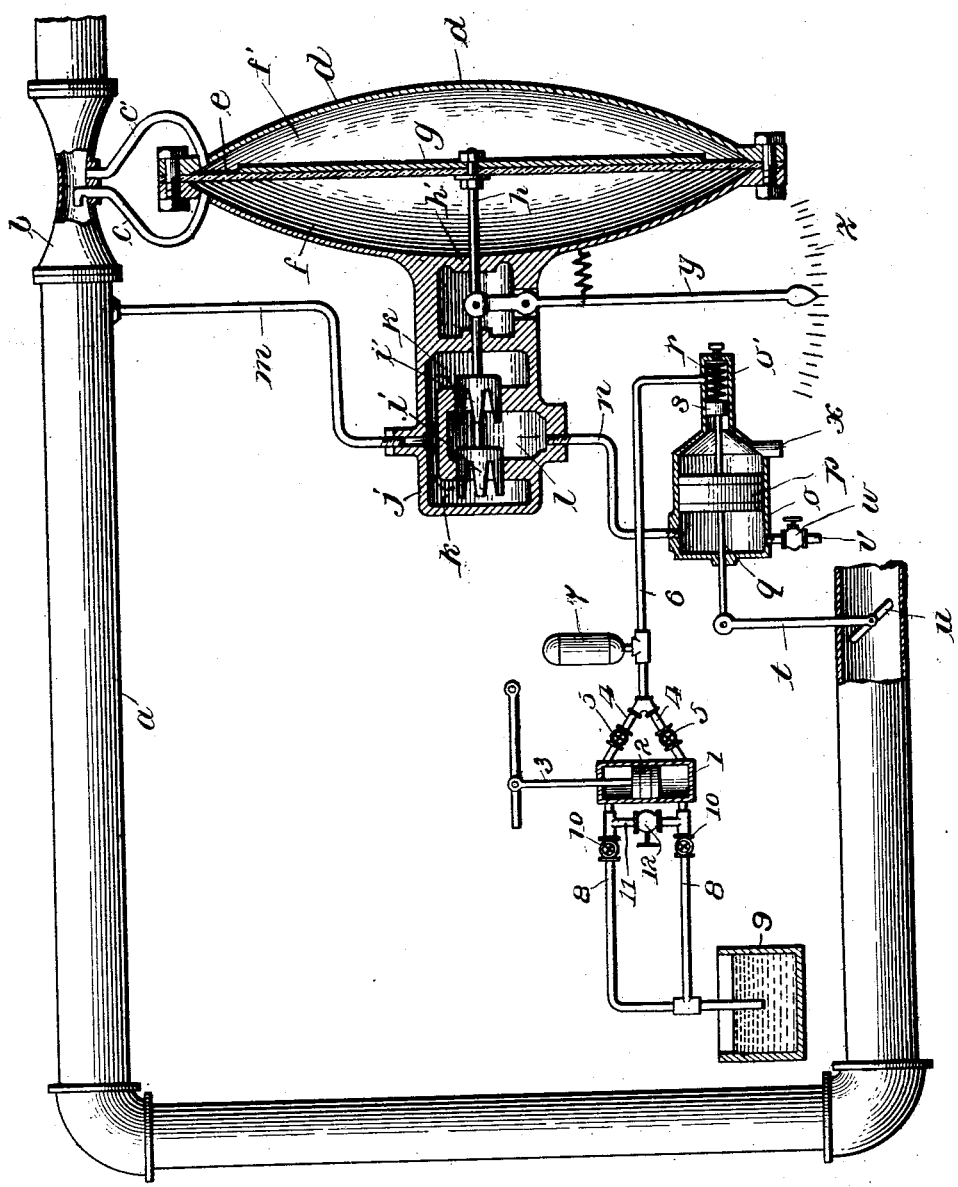
Witnesses:
H. S. Gaither
J. C. L.
Inventor:
Edward S. Cole
by A. Miller Rufield
Attorney.

No. 750,752. Patented January 26, 1904.

UNITED STATES PATENT OFFICE.

EDWARD S. COLE, OF CHICAGO, ILLINOIS.

MEANS FOR CONTROLLING FLOWING STREAMS.

SPECIFICATION forming part of Letters Patent No. 750,752, dated January 26, 1904.

Application filed July 25, 1902. Serial No. 117,011. (No model.)

*To all whom it may concern:*

Be it known that I, EDWARD S. COLE, a citizen of the United States, residing at Chicago, in the county of Cook and State of Illinois, have invented a certain new and useful Improvement in Means for Controlling a Flowing Stream, (Case No. 2,) of which the following is a full, clear, concise, and exact description, reference being had to the accompanying drawings, forming a part of this specification.

My invention relates to means for controlling the velocity or extent of flow of a flowing stream; and its principal object is to arrange for the automatic control of such flow, so as to maintain it practically constant under varying conditions.

My invention is particularly useful in connection with filters, especially large filters used in waterworks plants and systems. In certain forms of filters there is present a sand bed, which serves to collect the impurities of the water passing through the filter. At certain intervals it is necessary to cleanse this sand bed, and this is usually done by passing water through the filter in a reverse direction—that is, contrary to the normal flow—and as a result the impurities are carried back and out, thereby freeing the sand bed of impurities. After the filter has been cleansed and when put into use again the water flows through it much more readily, and consequently if the pressure is the same as before cleansing there will be a much greater flow. It often happens that a series or bank of filters of this kind are connected together in parallel between the inlet and outlet pipes and are cleansed one by one. In such case the filter last cleaned will allow a much more rapid flow of water through it than a filter which is to be next cleaned, and is therefore much clogged by impurities. The result is such an unduly large flow of water through the clean filter as to interfere with the efficiency and economy of the system.

In accordance with my invention I am able to control the liquid passing through each filter, so as to maintain the flow practically constant, irrespective of whether the filter is in a cleansed or clogged condition.

In accordance with my invention I control the flow of liquid along or through a given pipe or passage by arranging to check or reduce the flow when its velocity increases or tends to increase and to increase the flow when its velocity diminishes or tends to diminish.

In the arrangement herein shown for carrying out my invention I provide a controling-valve in the pipe or passage, so that the flow therein can be increased or diminished by proper actuation of the valve, and I actuate this valve, as required, by mechanism governed by the velocity of the flow in the pipe or passage, said mechanism being held in equilibrium or inactive by the velocity which produces the normal flow and being actuated by an increased or lessened flow to actuate the valve, so as to cause it to either close the pipe or passage farther or open the same more, as the case may be.

I will explain the arrangement herein shown for carrying out my invention more in detail in connection with the accompanying drawing.

In the drawing the figure is a view partly in vertical section, partly in elevation, and partly diagrammatic of a pipe or passage in which the liquid to be controlled is flowing and mechanism embodying my invention for maintaining such a flow practically constant.

In the figure, $a$ represents the pipe through which the liquid to be controlled or maintained constant is flowing, the direction of flow being indicated by the arrow. This pipe $a$ can be any pipe of the system. In case the apparatus is used with filters it can be either the inlet or outlet of a filter. This pipe is conveniently provided with a section $b$, tapering from its ends to its middle portion, so that the latter forms a contracted or reduced opening or orifice for the passage of the liquid. This tapering section $b$ is not essential, as the apparatus will readily operate with simply the ordinary pipe; but it is desirable because it furnishes the contracted orifice where the flow of liquid is increased. A pair of tubes $c\ c'$ are fitted to the middle portion of the tapering pipe-section $b$, the tube $c$ having a bent end, which extends into the interior of the pipe-section $b$ and faces the oncoming water, and the tube $c'$ being desirably arranged so that its upper end is flush with the inner surface of the wall of such pipe-section. The tubes $c$ and $c'$ have their lower ends connected with opposite sides of a hollow drum $d$, which is conveniently made in circular form and contains a central diaphragm $e$, of rubber or other suitable flexible material. The diaphragm $e$ is fitted tightly to the edges of the drum $d$, so as to divide the latter into two opposite air-tight chambers $f$ and $f'$. The tubes $c c'$ communicate, respectively, with the upper ends of these two chambers. By this arrangement it will be seen that the static pressure of the liquid passing in the pipe-section $b$ is communicated to the opposite sides of the diaphragm $e$ and will place that diaphragm in equilibrium. It will be further seen, however, that the pressure of the velocity of the liquid is communicated to the interior of the chamber $f$ through the pipe or tube $c$, and hence there is a pressure on one side—that is, the left side—in the figure of the diaphragm $e$, due to the pressure of the liquid-flow, and this pressure varies, of course, with the variation in the velocity of the liquid passing through the pipe. The diaphragm $e$ is provided with a circular disk $g$, and to this is connected a rod $h$, which extends out through one side of the drum $d$ through a bearing or box $h'$, which is understood to be packed and air-tight. This rod $h$ forms the reciprocating rod carrying the valves $i$ $i'$ of a balanced valve $j$, whose casing is conveniently formed integral with one of the dished members of the drum $d$. This balanced valve $j$ is of well-known construction, having side inlet-chambers $k$ $k$ and a central outlet-chamber $l$, so that the liquid passing through the valve exercises its pressure upon the outer faces of the two valves $i$ $i'$, thereby neutralizing any liquid-pressure upon the movable part of the valve, the valve-opening being varied, of course, as the valves $i$ $i'$ are moved in unison either to the right or to the left. By such arrangement it will be seen that the diaphragm $e$ controls the passage of liquid through the balanced valve $j$, a movement of the diaphragm to the right either opening the passage of the valve or increasing the extent of its opening and a movement to the left either closing such passage or decreasing its extent of opening. The inlet side of the balanced valve $j$ is connected, as by a pipe $m$, with the pipe $a$, whereby the liquid passing through the latter pipe is admitted to the balanced valve. The outlet side of the valve $j$ is connected, as by a pipe $n$, with one side or end of a cylinder $o$, which latter contains a piston $p$, having a piston-rod $q$. The other end of the cylinder $o$ is conveniently made with an extension $o'$, and in this is arranged a spring $r$, adapted to act against the enlarged end $s$ of the piston-rod $q$, which enlarged end forms a supplemental piston working in the chamber formed by the extension $o'$. The piston-rod $q$ is connected with a link $t$, carrying a valve $u$, arranged in the pipe $a$. An outlet-pipe $v$, having a valve $w$, extends from the front side of the cylinder $o$, and the rear side is provided with an open pipe $x$. In this way it will be seen that the liquid passing from the pipe $a$ through the small pipe $m$ into and through the balanced valve $j$ finds its way into the front end of the cylinder $o$ and exerts a pressure upon the piston $p$, tending to thrust the same backwardly, it being understood that the valve $w$ is closed to such an extent as to cause the exertion of pressure by liquid admitted to the cylinder through the pipe $n$. This pressure causes a backward movement of the piston, which movement is resisted by the spring $r$ to prevent its becoming excessive. As the balanced valve is opened more, the amount of liquid permitted to pass through it and into the cylinder $o$ is increased, and thereby the pressure exerted upon the piston $p$ is increased and the piston is moved a greater extent. As the balanced valve $j$ has its opening reduced, the amount of liquid passing through such valve is lessened, thereby reducing the pressure upon the piston $p$ and permitting the same to move outwardly, whereby as the piston $p$ is moved one way or the other the valve $u$ in the pipe $a$ is actuated, so as to vary the extent of opening in such pipe, the valve $u$ being actuated in a way to tend to close the pipe when the pressure in the cylinder $o$ is increased and the piston moved backwardly and being actuated in a way to tend to open the pipe when such pressure is reduced and the piston moved forwardly. It being now remembered that the diaphragm $e$ is moved to the right or in a direction to open the balanced valve $j$ as the velocity of the liquid in the pipe $a$ increases it will be seen that this diaphragm movement will cause the piston $p$ to actuate the valve $u$ in a manner to reduce the opening in the pipe $a$, and it will also be seen that as the velocity in the pipe $a$ decreases the diaphragm $e$ will be permitted to swing or move back to the left to reduce the opening in the balanced valve $j$, whereupon the piston $p$ will be allowed to move forwardly to actuate the valve $u$ in a manner to increase the opening in the pipe $a$. Thus an increase in the velocity of the liquid in the pipe $a$ causes the flow of the liquid to be automatically checked or reduced, and a reduction in the velocity of the liquid-flow causes the flow to be automatically increased.

As a convenient manner of indicating the liquid-flow through the pipe or system a pointer $y$ is connected with the rod $h$ and arranged to move over a graduated scale $z$, so that the movements of the rod $h$ as caused by the movements of the diaphragm will swing the pointer $y$ to make the proper indications.

It will be understood that the arrangement thus set forth is regulated to automatically control the flow of liquid under given conditions in any particular system. In certain cases, however, it is desirable to permit a very much greater flow through the pipe or system than would be permitted by the arrangement above set forth. In filter systems it is often desirable to pass much more than the normal quantity of water through the filters under certain conditions when the water is exceptionally pure. To permit this, I arrange means for adapting the system to a much greater flow of liquid. In the arrangement I have shown for this purpose I provide a cylinder 1, having a piston 2, whose piston-rod 3 is understood to be connected in any suitable manner with the cross-head or other part of the main pumping-engine supplying the system with water, in which way the piston 2 will be reciprocated back and forth in correspondence with the reciprocation of the pump. This cylinder 1 is provided with branch pipes 4 4, having check-valves 5 5, and these branch pipes are connected, as by a pipe 6, with the extension or supplemental cylinder $o'$. The pipe 6 is desirably provided with a pressure-bulb 7. Pipes 8 8 are extended from the opposite ends of the cylinder 1 to a suitable reservoir or tank 9, each pipe 8 being provided with a check-valve 10. The pipes 10 10 are connected together by a pipe 11, having a valve 12. By such arrangement the operation of the piston 2 builds up a pressure which is communicated by the pipe 6 to the extension $o'$ of the cylinder $o$, thereby increasing the dampening effect of the spring $r$. The pressure of this pump is regulated by the valve 12 in the by-pass 11, this valve being partly opened during the pumping operation and being throttled, more or less, as required, to increase or diminish the pressure. The liquid, which may be oil, is as a matter of fact churned back and forth through the by-pass 11 by the pumping action, the resistance offered by the valve 12 determining the pressure. The check-valves 10 10 prevent the liquid being forced through the pipes 8 8. Should there be any leakage into the cylinder 2 and through the outlet $x$, this will be made up from the reservoir 9. When it is not desired to use this pumping arrangement for permitting an increased flow of the liquid, the piston-rod 3 can be uncoupled, so as to permit the liquid to pass freely through the by-pass 11.

From the foregoing it will be seen that by my invention I provide a simple, reliable, and practical arrangement for automatically maintaining constant any desired flow of liquid. It will be understood that the various parts of the apparatus can be changed, altered, or modified and that in place of them other devices can be substituted. For example, in place of the tubes $c$ $c'$ and diaphragm-containing drum $b$ any other arrangement operable by variations in the velocity of the liquid-flow can be employed. Also in place of the balanced valve $j$ and coöperating devices other appliances can be used.

It will therefore be understood that I do not wish to limit myself to the specific apparatus herein set forth. It will also be understood that the apparatus herein set forth can be employed for use in connection with flowing fluids other than liquids, and hence it is not intended to limit this application or its claims to use of the apparatus with liquids alone.

What I claim as my invention is—

1. The combination with a conduit for the flowing stream, of a device controlled by variations in the velocity of the stream, mechanism receiving fluid from the conduit and operated thereby, for varying the extent of flow in the conduit, and means actuated by said device for controlling the passage of fluid passing to said mechanism, substantially as described.

2. The combination with a conduit for the flowing stream, of a drum divided into two chambers by a flexible diaphragm, and a pair of tubes connecting the interior of the conduit with the two chambers of said drum, one of said tubes being extended into the passage-way and arranged to face the oncoming fluid of the flowing stream, substantially as described.

3. The combination with a conduit for the flowing stream, of a drum divided into two chambers by a flexible diaphragm, a pair of tubes connecting the interior of the conduit with the two chambers of said drum, one of said tubes being extended into the passage-way and arranged to face the means in said conduit for oncoming fluid of the flowing stream controlling the flow therein, and means actuated by said diaphragm for actuating said flow-controlling means, substantially as described.

4. The combination with a conduit for the flowing stream, of a drum containing a diaphragm dividing it into two chambers, a pair of tubes connecting the interior of the conduit with the two chambers of the drum, one of said tubes being extended into the passage-way and arranged to face the oncoming fluid of the flowing stream, valve mechanism controlled by said flexible diaphragm, a pipe connection between said valve mechanism and the conduit, a piston and cylinder connected with said valve mechanism and controlled by the fluid passing through the same, and a valve in the conduit controlled by said piston, substantially as described.

5. The combination with a conduit for the flowing stream, of a pair of tubes $c$, $c'$, a drum containing a diaphragm dividing it into two chambers, the pipes $c$, $c'$ being connected with the two chambers of said drum, a balanced valve mechanism controlled by the flexible diaphragm in said drum, a connection between said balanced valve mechanism and the conduit in which the stream flows, a piston and cylinder, the latter having a connection with the balanced valve mechanism, a valve controlling the flow of fluid in the conduit, and a connection between said piston and said valve, substantially as described.

6. The combination with a conduit for the flowing stream, having a section $b$ forming a contracted orifice, of a pair of tubes $c, c'$, a drum containing a diaphragm dividing it into two chambers, the tubes $c, c'$ being connected with the two chambers of said drum, a balanced valve controlled by the flexible diaphragm in said drum, a connection between said balanced valve and said conduit, a piston and cylinder, the latter having a connection with the balanced valve, a valve controlling the extent of flow in said conduit, and a connection between said piston and said valve, substantially as described.

7. The combination with a cylinder $o$ having a piston $p$, of means for varying the pressure in the cylinder on one side of the piston, means for controlling the flowing stream actuated by the piston in accordance with such variations, and a pump and connections whereby the operation of the pump varies the pressure on the other side of the piston, substantially as described.

8. The combination with a conduit for a flowing stream, of valve mechanism, means controlling said mechanism, said means being operable by variations in the current velocity, a piston and cylinder, the cylinder being connected with said valve mechanism, and a valve controlling the flow in the conduit, actuated by said piston.

9. The combination with a conduit for the flowing stream, of tubes $c, c'$, connected with the conduit, a drum $d$ containing a flexible diaphragm dividing the drum into two chambers with which the tubes $c, c'$ are respectively connected, and balanced valve mechanism $j$ having valves $i, i'$ carried by a rod $h$, which latter is controlled by the diaphragm in the drum $d$, substantially as described.

10. The combination with a conduit for the flowing stream, of a device operable by variations in the velocity of the stream, a piston and cylinder, means for admitting fluid into said cylinder on one side of the piston, means for controlling the flow thereof by said device, a valve in the said conduit controlled by said piston and cylinder, and means for producing a counter-pressure on the other side of the piston varying in accordance with variations in the current-flow, substantially as described.

11. The combination with a conduit for the flowing stream, of tubes $c, c'$ opening into said conduit, one of said tubes being extended into the same and being bent so as to face the oncoming fluid, a drum having a diaphragm dividing it into two compartments, the tubes $c, c'$ communicating with the two chambers of the drum, a valve $u$ in the said conduit, and means for controlling the valve $u$ by movements of the diaphragm in said drum, substantially as described.

12. The combination with a conduit for the flowing stream, of a tapering section thereof providing a contracted orifice, tubes $c, c'$ opening into said tapering section, one of said tubes being extended into the same and being bent so as to face the oncoming fluid, a drum having a diaphragm dividing it into two compartments, the tubes $c, c'$ communicating with the two chambers of the drum, a valve $u$ in said conduit, and means for controlling the valve $u$ by movements of the diaphragm in said drum, substantially as described.

13. The combination of a conduit for the flowing stream, of tubes $c, c'$ opening into said conduit, one of said tubes being extended into the same and being bent to face the oncoming fluid, a drum having a diaphragm $e$, the said tubes $c, c'$ being connected with said drum, valve mechanism operated by the diaphragm $e$, a pipe $m$ connecting the said conduit with the valve mechanism, and means controlled by variations in the flow of the fluid through the valve mechanism for governing the flow of fluid in said conduit, substantially as described, 14. The combination with a conduit for the flowing stream, of means operated by variations in the velocity of the stream for controlling the same, a pump, and means for opposing the action of the pump to said controlling means, whereby the latter will be adapted to control an increase in the flowing stream, substantially as described.

15. The combination with a conduit for the flowing stream, of a device operable by variations in the velocity of the stream, a piston and cylinder, means for admitting fluid into said cylinder on one side of the piston, means for controlling the flow thereof by said device, a valve in the said conduit controlled by said piston and cylinder, and means for producing a variable counter-pressure on the other side of the piston, substantially as described.

16. The combination with a conduit for the flowing stream, of a device operable by variations in the velocity of the stream, a piston and cylinder, means for admitting liquid into said cylinder on one side of the piston, means for controlling the flow thereof by said device, a valve in the said conduit controlled by said piston and cylinder, and a pump and connections whereby the pressure produced by the pump opposes the piston action caused by said admission of liquid on one side thereof, substantially as described.

17. The combination with a conduit for the flowing stream, of a device operable by variations in the velocity of the flow, a piston and cylinder, means for admitting liquid into said cylinder on one side of the piston, means for controlling the flow thereof by said device, a valve in the said conduit controlled by said piston and cylinder, a pump-cylinder 1 having a piston 2 connected with the main pump of the system, and a pipe 6 extending to the said cylinder and communicating with the same in the rear of the piston, substantially as described.

18. The combination with the cylinder $o$ having a piston $p$, of a valve $u$ controlled by said piston, means for varying the pressure in the cylinder on one side of the piston to actuate the same to control the valve $u$, and a pump and connections whereby the operation of the pump varies the pressure on the other side of the piston, substantially as described.

19. The combination with a conduit for the flowing stream, of tubes $c$ $c'$ opening into the same, one of said tubes $c$ being extended into the conduit and being bent so as to face the oncoming fluid, a drum $d$ having a diaphragm $e$ dividing it into two chambers, the tubes $c$, $c'$ being in communication with said chambers, a rod $h$ connected with said diaphragm, balanced valve mechanism $j$ having valves $i$, $i'$ mounted on the rod $h$, a tube or pipe connection $m$ between said conduit and the balanced valve mechanism $j$, a cylinder $o$ having a piston $p$, the cylinder $o$ being constructed with an extension $o'$ and provided with a valve-outlet pipe $v$, and the piston-rod having a supplemental piston $n$ arranged to work in the extension $o'$, a pipe connection between the balanced valve mechanism and the cylinder $o$ whereby the pressure is varied in front of the piston, a valve $u$ in said conduit, and means for connecting the same with the piston-rod, a pump-cylinder 1 connected with the extension $o'$ of the cylinder $o$, a reservoir 9, pipes 8, 8 extending between the reservoir 9 and the pump-cylinder 1, said pipes having check-valves 10 10, and a valved connecting-pipe 11 between the pipes 8, 8, substantially as described.

20. The combination of a device having a flexible member, of means for communicating to said member the velocity-pressure of a flowing stream so that variations in such pressure will actuate said member, and means operated by said device for controlling the flowing stream, substantially as described.

21. The combination with a drum having a diaphragm, of means for communicating the static pressure of a flowing stream to both sides of the diaphragm, and the velocity-pressure to one side only thereof, and means operable by the diaphragm for controlling the flowing stream, substantially as described.

22. The combination with a drum having a diaphragm, of means for communicating the static pressure of a flowing stream to both sides of the diaphragm, and the velocity-pressure to one side only thereof, and means operated by the diaphragm for maintaining the liquid-flow practically constant, substantially as described.

23. The combination with a drum having a diaphragm, of means for communicating the static pressure of a flowing stream to both sides of the diaphragm, and the velocity-pressure to one side only thereof, and means operated by the diaphragm for restraining an excessive flow, substantially as described.

24. The combination of a drum having a flexible diaphragm, and a pair of tubes communicating respectively with the interior of the drum on opposite sides of the diaphragm and having their ends located close to one another, the ends of one of said tubes being bent laterally, substantially as described.

25. The combination with a drum having a flexible diaphragm, of means for communicating the static pressure of a flowing stream to both sides of the diaphragm and the velocity-pressure to one side only thereof, a valve adapted to control the flowing stream, a device for actuating the valve, and means operated by the diaphragm for controlling the valve-actuating device, substantially as described.

26. The combination of a drum having a flexible diaphragm, means for communicating the static pressure of a flowing stream to both sides of the diaphragm and the velocity-pressure to one side only thereof, a valve adapted to control the flowing stream, a cylinder having a piston connected with said valve, and means operated by said diaphragm for controlling the pressure acting on one side of said piston, substantially as described.

27. The combination of a drum having a flexible diaphragm, of a valve, a cylinder having a piston connected with said valve, a pipe connected with said cylinder, and means actuated by said diaphragm for regulating admission to or flow in said pipe.

In witness whereof I hereunto subscribe my name this 28th day of June, A. D. 1902.

EDWARD S. COLE.

Witnesses:
A. MILLER BELFIELD,
I. C. LEE.

It is hereby certified that in Letters Patent No. 750,752, granted January 26, 1904, upon the application of Edward S. Cole, of Chicago, Illinois, for an improvement in "Means for Controlling Flowing Streams," an error appears in the printed specification requiring correction, as follows: On page 3, lines 100–101, the words "means in said conduit for" before the word "oncoming," line 101, should be stricken out and inserted before the word "controlling," line 102; and that the said Letters Patent should be read with this correction therein that the same may conform to the record of the case in the Patent Office.

Signed and sealed this 23d day of February, A. D., 1904.

[SEAL.]

F. I. ALLEN,
*Commissioner of Patents.*